United States Patent Office.

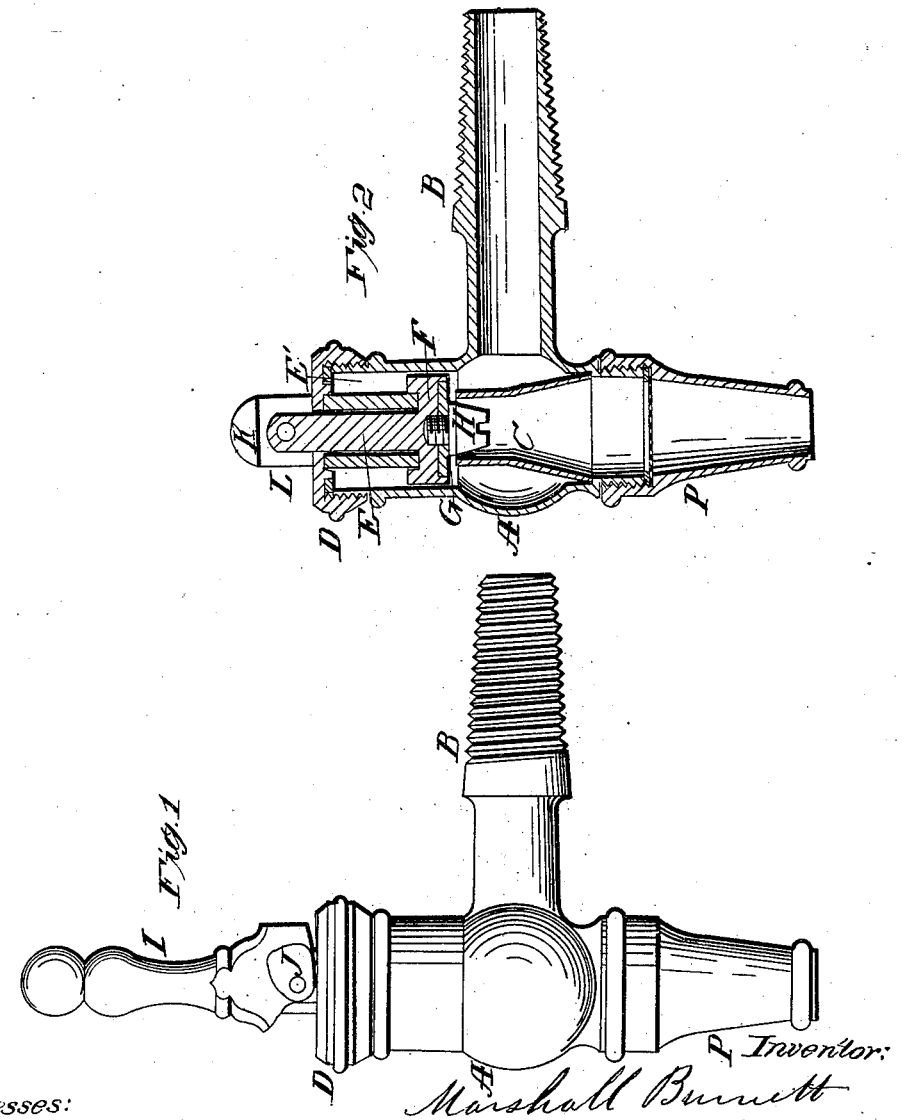

MARSHALL BURNETT, OF BOSTON, MASSACHUSETTS.

Letters Patent No. 65,791, dated June 18, 1867.

IMPROVEMENT IN FAUCETS.

The Schedule referred to in these Letters Patent and making part of the same.

TO ALL WHOM IT MAY CONCERN:

Be it known that I, MARSHALL BURNETT, of Boston, Suffolk county, State of Massachusetts, have invented certain new and useful Improvements in Faucets; and I do hereby declare the following description and accompanying drawings are sufficient to enable any person skilled in the art or science to which it most nearly appertains, to make and use my said invention or improvements without further invention or experiment.

The nature of my invention and improvements consists in the combination and arrangement of devices described and claimed in the following specification.

Figure 1 is an elevation of a faucet with my improvements.

Figure 2 is a vertical central section without the lever.

In these drawings, B is a supplying tube fitted for inserting into the pipe or vessel from which the liquid is to be drawn. This tube terminates in the cylinder A, made in the form shown, or in such other form as will answer the purpose, and is provided with an inner cylinder, C, which is joined to the cylinder A below the tube B, and extends up a little above the opening from the tube B, so that the liquid flowing in through B will rise between C and A and flow down through C out of the faucet. I cut a screw on the cylinder A and fit the cap D to it, and perforate the cap for the stem E of the valve F to traverse in when the valve is worked. This valve is made large so as to nearly fill the interior of the cylinder A, and so that when it is pushed down on to the end of the cylinder C to close it, the valve will move against the water flowing up around the cylinder C, and be closed slower than if the valve did not act against the flow of water. And as the valve is pushed down the water passes slowly up around it into the chamber above, which tends to prevent the water from hammering the valve. There is a recess turned in the under side of the valve F for the India-rubber packing G, which is held in by the conical-headed screw H, which conical head gradually narrows the opening in the cylinder C, when the valve is closed to prevent the water from hammering the valve. There is an India-rubber spring, E', around the stem of the valve, which enters recesses in the valve and in the cap, and packs the cap around the stem to prevent any leak of the liquid. The upper end of the stem E is perforated for the screw which connects it to the lever I. The lower end of this lever works against the top of the cap D to raise the valve when the lever is vibrated in one direction, and when it is vibrated in the opposite direction the cams J on the lever act under the flanges K on the cheeks L of the cap, so as to force the valve down against the upward flow of the water. In fig. 1 the cheek is omitted to show the cam on the lever, and in fig. 2 the lever is omitted to show the flange on the cheek L. There is a ring of India rubber put in the cap to pack the end of the cylinder when the cap is screwed on. I make a screw-thread on the lower end of the cylinder A, and fit the discharge pipe P to it. Before I screw on the pipe P, I put into it a strainer of wove wire and a packing ring of India rubber to perfect the faucet.

I claim a faucet having the cylinder C, valve F, cone H, and cam-lever I J, all constructed and arranged substantially as shown and described.

MARSHALL BURNETT.

Winesses:
E. L. SHERMAN,
A. J. HILTON.